United States Patent
Goss

[15] 3,701,463
[45] Oct. 31, 1972

[54] HOLDING AND CARRYING RACK FOR MINIATURE OXYGEN AND FUEL GAS TANKS

[72] Inventor: Herbert C. Goss, Glenshaw, Pa.
[73] Assignee: Goss Gas, Inc., Glenshaw, Pa.
[22] Filed: Dec. 22, 1970
[21] Appl. No.: 100,583

[52] U.S. Cl. ................................................224/45 R
[51] Int. Cl. ....................................................B65d 61/00
[58] Field of Search.........224/45 A, 45 R; 280/47.19

[56] References Cited

UNITED STATES PATENTS

| | | |
|---|---|---|
| 2,570,504 | 10/1951 | van House..............280/47.19 |
| 3,429,449 | 2/1969 | Hamilton et al......224/45 R X |
| 1,875,248 | 8/1932 | Lynch..................280/47.19 X |
| 2,964,328 | 12/1960 | Muir......................280/47.19 |

*Primary Examiner*—Gerald M. Forlenza
*Assistant Examiner*—Jerold M. Forsberg
*Attorney*—Brown, Murray, Flick & Peckham

[57] ABSTRACT

An elongated horizontal base plate is provided for supporting a pair of miniature oxygen and fuel gas tanks side by side in upright position. Secured at their lower ends to the back corners of the plate is a pair of parallel upright side rails, the upper portions of which are inclined forward over the base plate. The upper ends of the side rails are connected by a handle. A cross member extends between the side rails and is connected to them below their inclined portions. Attached to the side rails above the base plate is a rigid retaining member that extends along the front of the base plate for holding tanks on the plate. The handle is located above the center of gravity of the rack so that the base plate will remain substantially horizontal when the rack is lifted by its handle. Hooks may project from the back of the rack to support a coil of hoses attached to the tanks.

3 Claims, 4 Drawing Figures

PATENTED OCT 31 1972 3,701,463

INVENTOR
HERBERT C. GOSS
BY Brown, Murray,
Flick & Peckham
ATTORNEYS

HOLDING AND CARRYING RACK FOR MINIATURE OXYGEN AND FUEL GAS TANKS

Conventional pressure tanks for oxygen and fuel gas, such as acetylene, used in welding and flame cutting, are several feet tall and quite heavy. They are generally moved about by tilting them on edge and then rolling them along the floor, or by fastening them onto two-wheeled hand trucks. For some uses, such as in home workshops, it is desirable to use tanks that are considerably smaller than the standard tanks. These miniature tanks are easier to upset than the larger ones and it is not feasible, especially in a home, to provide a hand truck for moving them around. It is among the objects of this invention to provide a rack which will hold a pair of miniature tanks in upright position, which is not easily upset and which is easy to carry about with the tanks in its.

The preferred embodiment of the invention is illustrated in the accompanying drawings, in which FIG. 1 is a front view of my rack with a pair of tanks shown in phantom;

Figure 1:
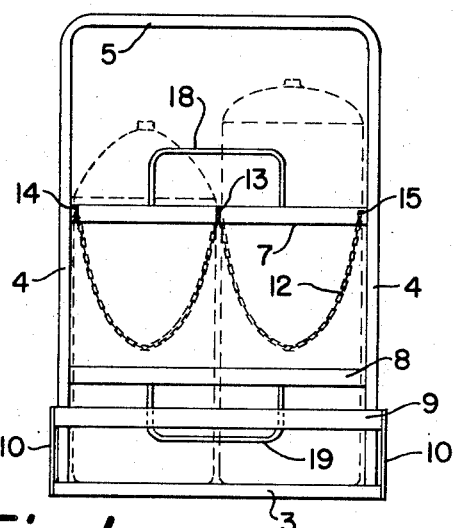

Referring to the drawings, a pair of miniature pressure tanks, such as an oxygen tank 1 and a fuel gas tank 2, rest in upright position side by side on a horizontal elongated base plate 3 that preferably is rectangular. Secured to the back corners of this plate are the lower ends of the pair of parallel upright side rails 4 rigidly connected at their upper ends by a handle 5. The side rails and the handle preferably are formed in one piece by bending a bar or pipe as shown.

Figure 2:
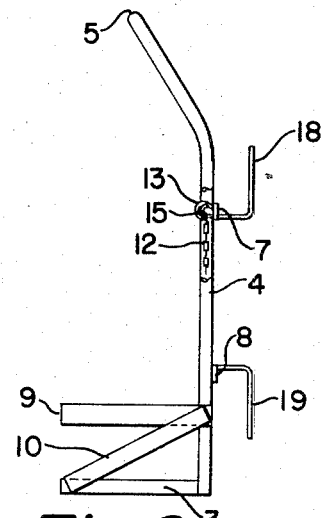
FIG. 2 is a side view.
Figure 3:
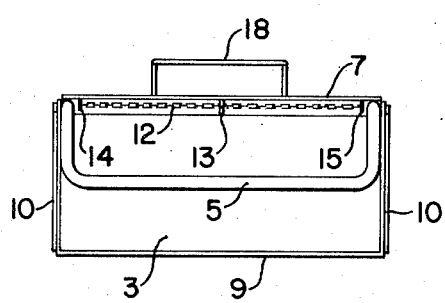
FIG. 3 is a plan view.

The rack is reinforced and made more rigid by welding or otherwise securing the opposite ends of upper and lower cross members 7 and 8 to the side rails. These cross members also prevent the tanks from sliding or falling off the back of the base plate. To prevent the tanks from sliding off the front edge of the base plate, a rigid retaining member 9 is spaced a few inches above the plate. It has a front portion extending along the front of the base plate and parallel end portions extending back to the side rails, to which they are attached. The front of the base plate can be supported from the side rails by means of inclined braces 10 extending from its front corners rearwardly and upwardly to the side rails as shown in FIG. 2.

The retaining member 9 will prevent the tanks from sliding off the front of the base plate, but to prevent them from tilting forward and possibly falling out of the rack, their upper portions are connected to the upper cross member 7 by means of a flexible band that can be a cable or a chain, a chain 12 being preferred. The central portion of this chain extends through a vertical ring 13 attached in any suitable manner to the center of the upper cross member. One end of the chain is attached by a suitable fastener 14 to one end of the cross member, but a hook 15 is secured to the opposite end of the cross member for that end of the chain. Two loops are thereby formed in he chain. Any link of the chain can be slipped over the hook to adjust the size of the loops. Before the tanks are set on the base plate, the two loops are made as large as possible. After the tanks have been inserted in the loops the chain is pulled from its free end to draw the loops tightly around the tanks and then it is fastened to the hook 15. The chain will slide through the center ring 13 during this operation.

Figure 4:
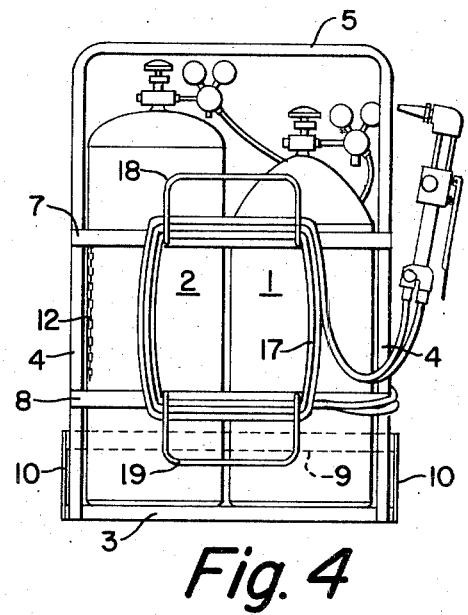
FIG. 4 is a rear view with the tanks and hoses shown in full lines.

When this apparatus is not in use, the hoses 17 that are connected to the two tanks can be taken care of by coiling them around hooks projecting from the back of the rack. As shown in FIG. 2, one hook 18 extends from the upper cross member 7 rearwardly and upwardly and the other hook 19 extends from the lower cross member 8 rearwardly and downwardly. The hoses are wrapped around the two hooks between their upright portions and the cross members as shown in FIG. 4. Preferably, each hook is formed from a rod that is bent into a loop having parallel horizontal end portions welded to the adjoining cross member and connected by a substantially vertical central portion.

Another feature of this invention is that the loaded rack can be picked up by its handle and carried about from one location to another without any difficulty. To enable this to be done with the least effort and inconvenience, the tanks should remain vertical while the rack is being carried. Accordingly, the upper end portions of the side rails of the rack are inclined upwardly and forwardly over the base plate as shown in FIG. 2 to locate the connecting handle 5 above the center of gravity of the rack. Then, when the rack is lifted by its handle, its base plate will remain substantially horizontal and the tanks thereon will remain vertical. This makes the rack much easier to carry than if it and the tanks tilt forward or backward while a person carries it at his side.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A holding and carrying rack for miniature oxygen and fuel gas tanks, comprising an elongated horizontal base plate having front and back sides, a pair of parallel upright side rails secured at their lower ends to the back corners of said plate, the upper portions of the side rails being inclined forward over the base plate, a handle connected at its ends with the upper ends of the side rails, a cross member extending between the side rails and connected thereto below said inclined portions, a rigid retaining member spaced above the base plate and extending from the side rails forward and then along the front of the base plate for holding a pair of said tanks side by side on the base plate in upright position, said handle being located above the center of gravity of said rack so that said base plate will remain substantially horizontal when the rack is lifted by its handle, a second cross member connected to the side rails between the first-mentioned cross member and said base plate, a hook member extending rearwardly and upwardly from the first cross member, a hook member extending rearwardly and downwardly from said second cross member, a chain extending across the rack above said base plate, means connecting one end of the chain to one side of the rack at substantially the level of said first cross member, means detachably connecting the opposite end of the chain to the other side of the rack, and means slidably connecting the central portion of the chain to the central portion of said first cross member to form two loops in the chain for receiving a pair of upright tanks to prevent them from tilting forward, said hook members being formed for receiving and holding hoses connected with the tanks and wrapped around the hook members.

2. A holding and carrying rack for miniature oxygen and fuel gas tanks, comprising an elongated horizontal base plate having front and back sides, a pair of parallel upright side rails secured at their lower ends to the back corners of said plate, the upper portions of the side rails being inclined forward over the base plate, a handle connected at its ends with the upper ends of the side rails, a cross member extending between the side rails and connected thereto below said inclined portions, a rigid retaining member spaced above the base plate and extending from the side rails forward and then along the front of the base plate for holding a pair of said tanks side by side on the base plate in upright position, said handle being located above the center of gravity of said rack so that said base plate will remain substantially horizontal when the rack is lifted by its handle, a flexible band extending across the rack above said base plate, means connecting one end of the band to one side of the rack at substantially the level of said cross member, means adjustably connecting the opposite end of the band to the other side of the rack, and means slidably connecting the central portion of the band to the central portion of said cross member to form two loops in the band for receiving a pair of upright tanks to prevent them from tiling forward.

3. A holding and carrying rack for miniature oxygen and fuel gas tanks, comprising an elongated horizontal base plate having front and back sides, a pair of parallel upright side rails secured at their lower ends to the back corners of said plate, the upper portions of the side rails being inclined forward over the base plate, a handle connected at its ends with the upper ends of the side rails, a cross member extending between the side rails and connected thereto below said inclined portions, a rigid retaining member spaced above the base plate and extending from the side rails forward and then along the front of the base plate for holding a pair of said tanks side by side on the base plate in upright position, said handle being located above the center of gravity of said rack so that said base plate will remain substantially horizontal when the rack is lifted by its handle, a second cross member connected to the side rails between the first-mentioned cross member and said base plate, a hook member extending rearwardly and upwardly from the first cross member, and a hook member extending rearwardly and downwardly from said second cross member, each of said hook members being in the form of an open loop having substantially horizontal end portions secured to the adjoining cross member and connected by a substantially vertical U-shaped central portion, the hook members being adapted to receive and hold hoses connected with the tanks and wrapped around the hook members.

* * * * *